United States Patent

[11] 3,614,165

| [72] | Inventor | Willi Ebser<br>Todtnau/Schwarzwald, Germany |
|---|---|---|
| [21] | Appl. No. | 883,463 |
| [22] | Filed | Dec. 9, 1969 |
| [45] | Patented | Oct. 19, 1971 |
| [73] | Assignee | Gottlieb Ebser Maschinenfabrik K.G.<br>Todtnau/Schwarzwald, Germany |
| [32] | Priority | Dec. 9, 1968 |
| [33] | | Germany |
| [31] | | P 18 13 473.1 |

[54] A WORK HOLDER FOR PROCESSING BRUSH BODIES
15 Claims, 10 Drawing Figs.

[52] U.S. Cl. .................................................. 300/10
[51] Int. Cl. .................................................. B25b 1/20
[50] Field of Search ........................................... 300/10, 11

[56] References Cited
UNITED STATES PATENTS

| 606,371 | 6/1898 | Young | 300/10 |
|---|---|---|---|
| 1,664,423 | 4/1928 | Jobst | 300/10 |

*Primary Examiner*—Granville Y. Custer, Jr.
*Attorney*—Michael S. Striker

ABSTRACT: The individual brush body is held within a work holder having cutouts which are gripped for purposes of transporting the work holder between stations. The work holder has at least one movable wall which is caused to bear against the brush body held therein. A rotatable bolt member is actuated for purposes of opening and closing the work holder by moving the movable wall. Supporting blocks and spring brackets within the work holder support and locate precisely the work while being processed at the work stations.

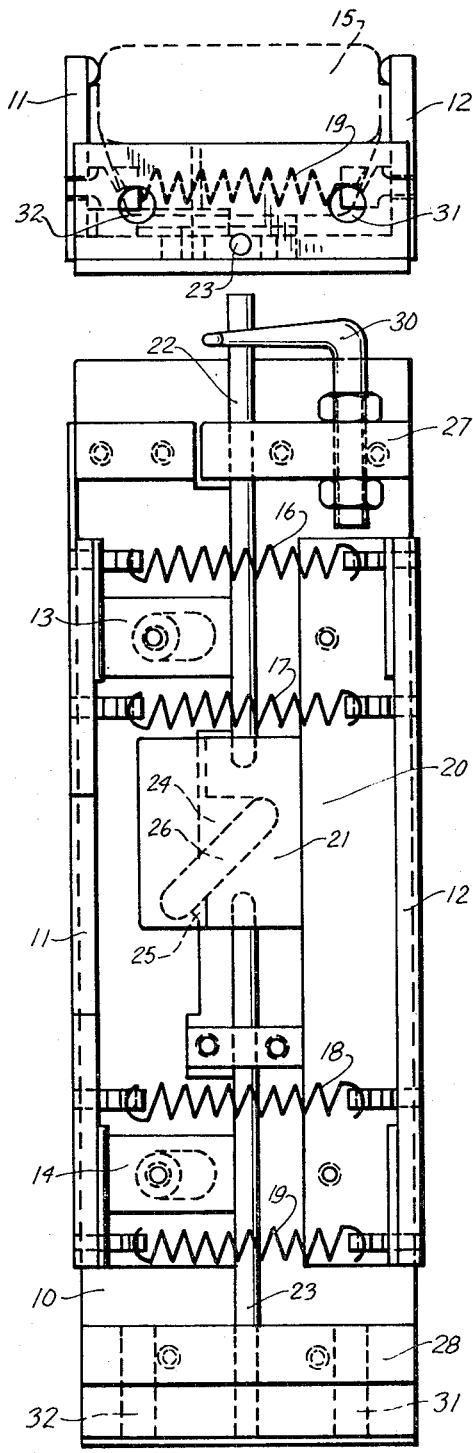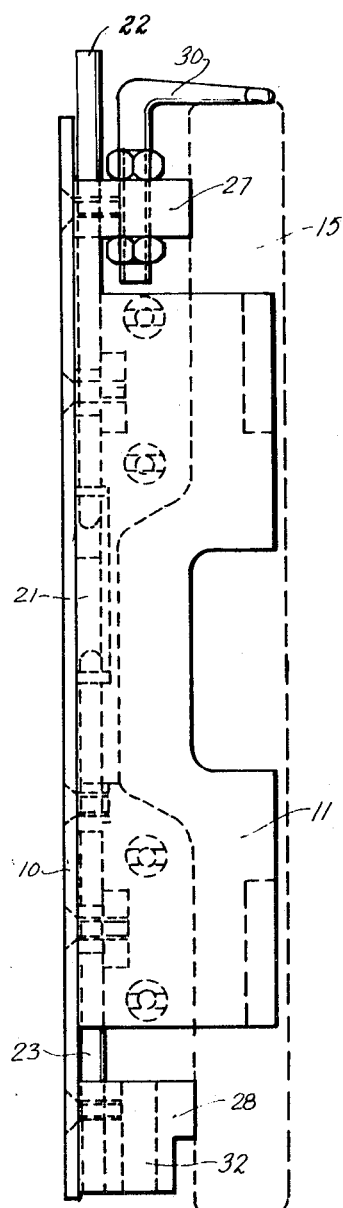
FIG. 4
FIG. 2
FIG. 3

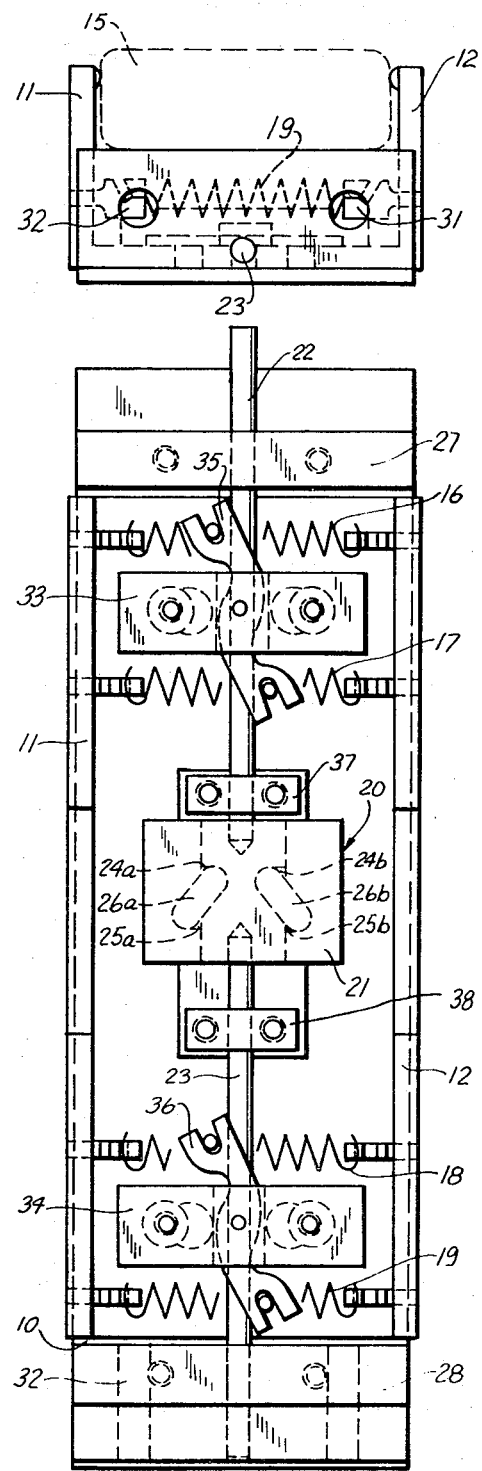
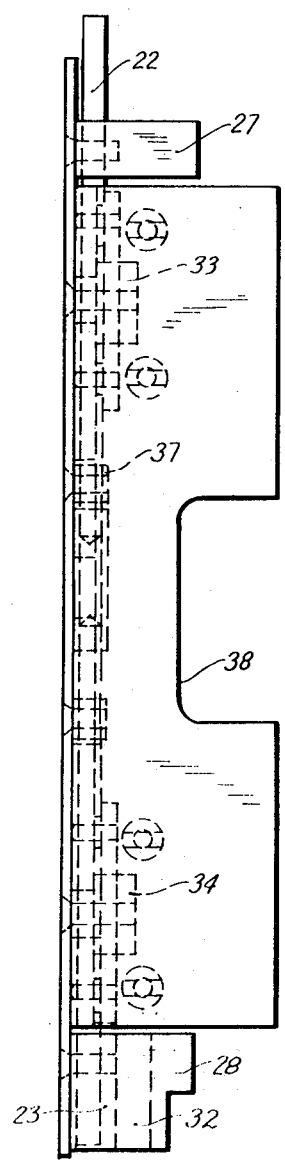
FIG. 7
FIG. 5    FIG. 6

A WORK HOLDER FOR PROCESSING BRUSH BODIES

BACKGROUND OF THE INVENTION

In the fabrication and manufacture of brooms and brushes, an essential work process consists of inserting brush material into the brush body. For this purpose, a conventional boring tool, a stuffing or insertion tool, and a shearing tool are arranged in cooperative relationship. The brush bodies are transferred either manually or entirely automatically one after another, to the individual work stations where they are operated upon and are conveyed further.

The present invention is directed to a work holder for holding brush bodies or similar workpieces during movement thereof between a plurality of work stations. Though gripping arms, the work holders are lifted up, are carried to the individual work stations where the brush bodies are processed, and are then conveyed further through these gripping arms, until the finished brush holder is collected at the end in a magazine.

The work holder is provided with a spring-loaded clamps or controllable positioning members at their ends in contact with the brush holder. These clamping or locating members grip the brush holder and hold it in place. In the conventional arrangement of this type, however, there is the disadvantage that when receiving and holding the brush holder, the position of the brush holder is not precisely defined. Displacements or deviations in position can easily occur in the work holder, through such conventional arrangements. Any such displacement or positional deviations are of disadvantage during the processing of the brush body, since the stuffing may be performed a nonuniform manner. A further disadvantage of such conventional arrangements reside in the condition that when the brush holders are held by the positioning members or spring-loaded clamps, it is not possible to process or bore shoulders having specially shaped bodies with nonuniform design. This results from the condition that the positioning members or clamps cannot grip and hold such brush bodies in a secure manner.

The present invention relates to a work holder for holding brush bodies through the particular steps of boring, stuffing and shearing actions. Displacement arrangements and gripping arms are provided for the purpose of conveying the work holder between work stations. The arrangement, in accordance with the present invention, avoids the disadvantages of the conventional arrangement and makes possible the precise and secure retention of the brush body during the work steps or processes, and is capable of accommodating specially designed brush bodies with complex shape. This is achieved through the present invention in that the brush bodies are firmly held in place within work a holders during the transportation and work steps. The work holders are provided with cutouts or recesses into which gripping arms reach and convey further the work holders.

In accordance with a further design of the present invention, an insertion arrangement is provided with displacement means for conveying the work holders which have been filled with brush holders.

In accordance with the present invention, furthermore, abutting members or levers are arranged on the insertion mechanism. These abutting members or levers grasp the work holders at the end and at the beginning of each operation cycle, and open or close these work holders.

In accordance with a further development and embodiment of the present invention, the work holders consists of a block member upon which are arranged walls running longitudinally and perpendicular to the block member. Tension springs are used for holding in place the cartridge walls, and an opening and closing mechanism is used to move at least one of the walls. Supporting members or blocks are, furthermore, used to support the brush holder.

SUMMARY OF THE INVENTION

An arrangement for processing brush holders carried among spaced work stations for applying different work operations to them. A work holder with cutouts or recesses is gripped and transported between work stations. The brush body to be worked upon at these stations, is retained within the work holder. At least one movable wall operates in conjunction with a fixed wall or another movable wall for opening an d closing the work holder. The walls are mounted on a block member and a spring arrangement urges the walls into closed position. A rotatable bolt arrangement is actuated to separated the walls for purposes of releasing the brush body therein. Supporting blocks within the work holder are shaped in accordance with the contour of the brush body, and spring brackets on the walls locate the brush body precisely within the work holder.

The novel features which are considered as characteristic for the invention are set fourth in particular in the appended claims. The invention itself, however, both as to its construction and its method of operation, together with additional objects and advantages thereof, will be best understood from the following description of specific embodiments when read in connection with the accompanying drawing.

BRIEF DESCRIPTION OF THE DRAWING

FIG. 2 is a plan view of a work holder used in the arrangement of FIG. 1;

FIG. 3 is a side view of the work holder of FIG. 2;

FIG. 4 is an end view of the work holder of FIG. 2;

FIG. 5 is a plan view of another embodiment of the work holder of FIG. 2;

FIG. 6 is a side view of the embodiment of FIG. 5;

FIG. 7 is an end view of the work holder of FIG. 5;

DESCRIPTION OF THE PREFERRED EMBODIMENTS

Figure 1:
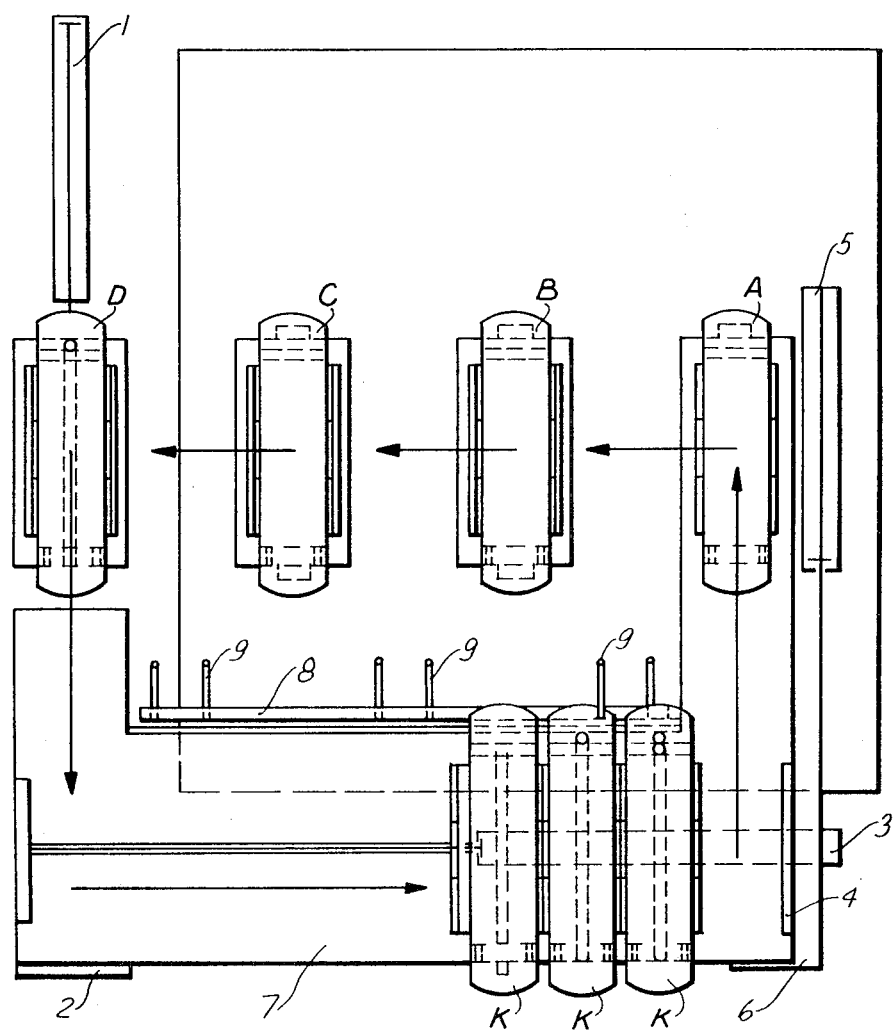
FIG. 1 is a plan view in schematic form and shows the arrangement of the work holders in relation to work stations and the transport mechanism, in accordance with the present invention.

Referring to the drawing and in particular to FIG. 1, an insertion arrangement 7 is substantially comprised of three displacement cylinders 1, 3 and 5, and at least three work holders K. The attending operator removes the finished brushes from these work holders and inserts thereinto also the brush bodies to be processed and worked upon. The work holders K is closed by pressing the rod 23, shown in FIGS. 2 to 7, inwardly. By actuating the displacement cylinder 3, the three work holders with the brush bodies are conveyed to the abutment 4 which releases the displacement cylinder 5 by any control arrangement known in the art, for instance a push bottom switch may be incorporated in the abutment 4 which closes when engaged by a brush body to thereby energize a solenoid valve to supply pressure fluid to cylinder 5. The outer right-hand work holder with the brush body is moved into the ready or operating position A through the member 6 which is on the piston rod and is moved through the displacement of the cylinder 5. The gripping pins or fingers 9 which are secured to an arm 8, then grip the work holder situated in the ready or operating position. Cylindrical bores are provided, for example, for this purpose on the work holder, and furnish corresponding recesses into which the gripping fingers may fit. The gripping arm 8 with the fingers 9 is movable in all three directions in space. In relation to the drawing, the gripping arm 8 moves towards the right until the fingers or gripping pins are in the position for reaching into the bores of a work holder. The gripping arm then moves upward in the plane of the drawing, until the fingers or pins reach into the bores. Corresponding fingers thereby reach into corresponding bores of the work holders situated at the stations B and C. The stations B, C and D represent the boring, stuffing, and shearing stations or tools, respectively.

For a purpose of conveying the work holders with the brush bodies from one position to the next position, the gripping arm with the fingers moves upward perpendicular to the plane of the drawing, and then towards the left in the direction of the arrow in the drawing. This leftward motion is made in a plane parallel to the plane of the drawing. The leftward motion is carried out until the work holders are situated over the next work station, at which location the gripping arm with the fingers and work holders drops or moves downward perpendicular to the plane of the drawing. When the gripping arm, in the plane of the drawing, moves downward into the position shown in FIG. 1, abutments strip the work holders from the fingers at the individual or respective work station. In this manner, a work holder with the brush body holder is conveyed from the ready station A, to the work stations B and C as well as D, in sequence.

When the gripping arm with the gripping fingers has moved again into the position shown in the drawing, a limit switch is actuated by the arm in the final phase or portion of the path for the purpose of initiating the shearing process. This limit switch is not shown. When the shearing process has been terminated, the displacement cylinder 1 becomes actuated and moves the work holder with the brush body in the direction of the arrow in the drawing, until the work holder reaches the abutment 2. The work holder is then opened as a result of the action of the displacement cylinder 1 which presses upon the rod or pin of the opening mechanism of the work holder. With the finished brush lying loosely within the work holder the latter is then conveyed into its initial position through the displacement cylinder 3. In this initial position of the work holder, the brush, in its finished condition, is removed by the attending operator, who also inspects the brush and inserts a new brush body. At that point, a work cycle has been completed.

The opened work holders function as a storage magazine when in the position shown in FIG. 1. The operating personnel removes the finished brushes from these work holders, inspect them, and insert new and unbored brush bodies, either at the same time, or in sequence. The operating personnel or attending operator closes the work holder by depressing the rod 23. With the closure of the work holder, the brush body is held in a fixed position within the work holder.

When the work holders are filled to provided with new brush bodies, the machine automatically bores, stuffs and shears the brush body. No action is thereby required from the attending operator. Thus, the operator has time to perform other work, and thereby it is possible to attend a number of different machines.

The work holder consists of a block 10 which can be considered to serve also as the base for the brush body and is usually made of metal. Two sidewalls 11 and 12 are arranged perpendicular to the base or block 10. These sidewalls are secured to the base through the use of screws. In the design of the embodiment of the present invention, the wall 11 is made movable and the wall 12 is fixed. The movable wall 11 is movably secured to the block 10 through screws 13 and 14 reaching into slots provided therefor. Thus, the wall 11 may be moved outward for the purpose of receiving the brush body, and then presses inward for the purpose of retaining or holding the brush body 15 in place. The holding action results from the condition that the movable wall is pressed inward and against the brush body 15, as a result of the action of the tension spring 16, 17, 18 and 19.

The opening and closing of the work holder is carried out through the motion of the movable wall 11 and the opening and closing mechanism 20. This mechanism consists in the embodiment of the present invention, of a centerpiece or member 21 and two rods 22 and 23. The rods and the centerpiece are made of metal and are firmly secured to each other.

The assembly of this centerpiece and rods is, however, displaceable in the longitudinal direction. The centerpiece 21 has a cutout 24 which lies across from a cutout 25 in the movable wall 11. A rotatable bolt 26 reaches into both cutouts. During longitudinal or axial motion of the rods 22 and 23 with the centerpiece 21, the bolt executes a rotational motion and presses, thereby, the wall 11 against the tension of the springs so that the wall is pressed outwardly. The bolt 26 rotates back to its initial position and releases the wall 11 when the centerpiece with the respective rods moves axially or longitudinally in the opposite direction. With the return of the bolt to its initial position, the work holder can be closed.

The work holder becomes opened as soon as it abuts the member 2 in FIG. 1, and the displacement cylinder 3 depresses the rod 22 of the opening mechanism. The work holder becomes reclosed by the attending operator after removal of the finished brush and insertion of a new unbored brush body. This is accomplished by depressing the rod 23 of the work holder for the purpose of actuating the bolt 26. This bolt 26 can advantageously be made of synthetic material such as nylon, for example. The brush body rests upon supporting blocks 27 and 28. The shape and form of these supporting blocks can be designed to conform to the requirements of the brush body. In addition, the supporting block possess bores for the purpose of guiding the rod 22 and 23 of the opening mechanism.

The work holder is, furthermore, provided with an abutting member 30 for precise location of the brush body. In addition, the supporting block 28 contains at its frontal side, cylindrical bores 31 and 32 for receiving the rods or fingers 9 of the gripping arm 8, shown in FIG. 1.

A somewhat more complex arrangement of the work holder is shown in FIG. 5 to FIG. 7, for the purpose of also accommodating brush bodies with more complex and unusual shape. In principal, the work holder is constructed similar to the design of FIGS. 2 to 4. Identical parts are, consequently, denoted with the same reference numerals. The design of the work holder of FIG. 5 to FIG. 7 differs from the more simpler work holder in that the sidewalls 11 and 12 are made movable. The opening and closing mechanism associated with the design of FIGS. 5 to 7 is correspondingly also constructed so that both walls are forced outward during axial or longitudinal motion of the mechanism. Accordingly, two cutouts 24a and 24b are provided in the centerpiece 21. These cutouts 24a and 24b lie opposite cutouts 25a and 25b in both walls 11 and 12. A bolt 26a and 26b is provided for each of the two cutouts. These bolts execute a rotational motion during axial or longitudinal motion of the centerpiece with the rod. As a result of such rotational motion of the bolt, the two walls are forced outward against the action of the springs. In order to produce uniform motion of both of the walls, work holder is, furthermore, provided with two parallel guide members 33 and 34 which are associated with levers 35 and 36 possessing slots at their ends. These levers 35 and 36 reach into pins on the walls 11 and 12 trough their slots, and during axial or longitudinal motion of the centerpiece, the walls are forced outward with these pins. Additional guides 37 and 38 are, furthermore, provided for the pins 22 and 23. The functional operation of the resulting work holder for both movable sidewalls is substantially identical in principal to the arrangement of the more simpler work holder described in FIGS. 2 to 4.

The use of work holders in an arrangement for processing and fabricating brushes, in accordance with the present invention, has the advantages that substantially all types of brush bodies may be processed, independent of their geometrical shape. Furthermore, through interchanging of supporting blocks and locating members, it is possible to accommodate any shape of brush body without difficulty, and to insert such brush bodies for proper processing into the work holder. Thus, through rapid interchanging of such supporting blocks and locating members, the work holder design may be adapted readily to the desired type of brush body.

Figure 10:
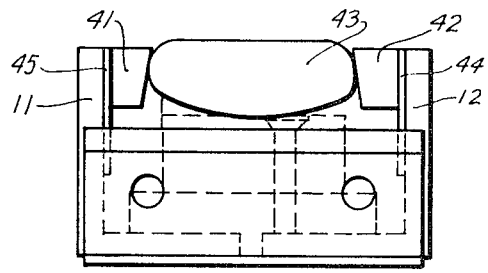
FIG. 10 is an end view of the work holder of FIG. 8.
Figure 8:
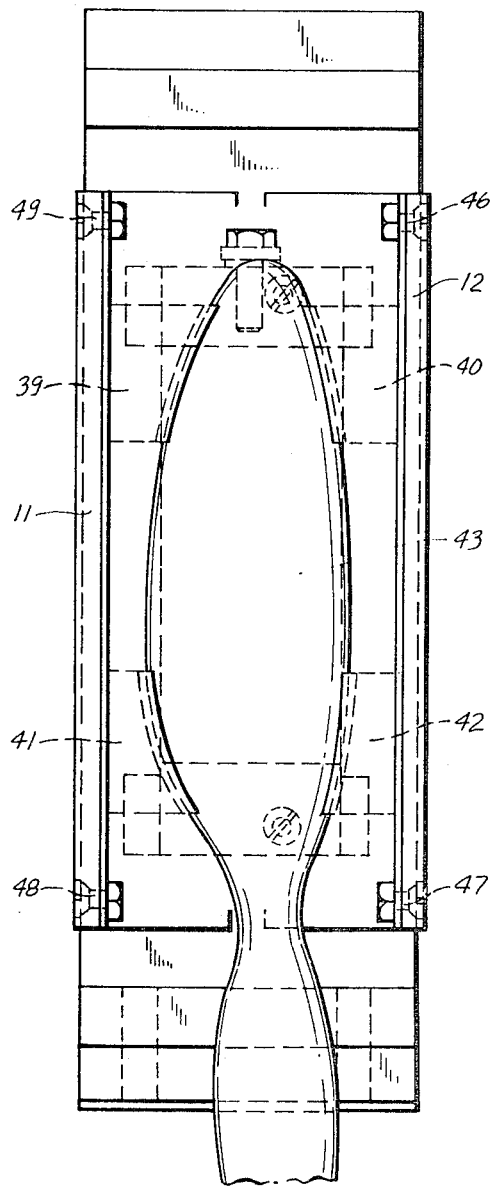
FIG. 8 is a plan view of a work holder designed to conform to the specific contour characteristics of a brush body.
Figure 9:
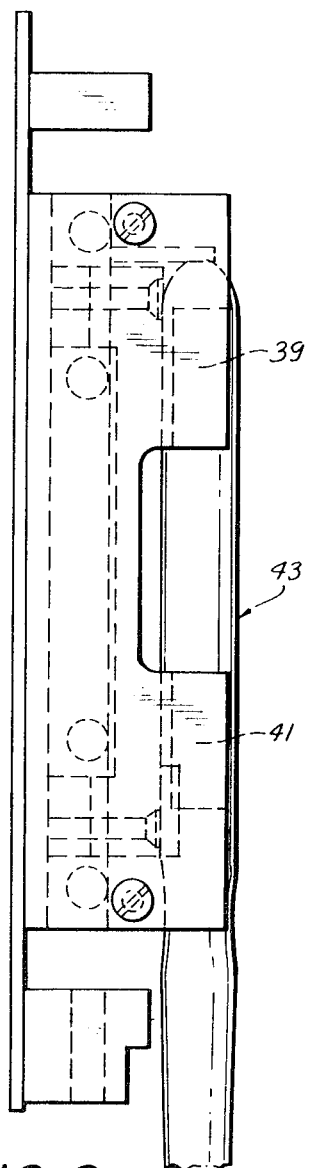
FIG. 9 is a side view of the work holder of FIG. 8.

FIGS. 8 to 10 illustrate the application of a brush body 43 which is particularly difficult to hold in place for processing. Locating and holding members 39, 40, 41 and 42 press against the body 43, and are secured to plates 44 and 45 through means of screws 46, 47, 48 and 49 in the walls 11 and 12. By bearing against the brush body 43, these locating members hold the brush body in place. By simply interchanging these positioning and locating elements 39, 40, 41 and 42 as well as the supporting blocks, the same work holder may be used for different shapes and types of brush bodies. Accordingly, the remainder of the work holder, is constructed in a manner corresponding to that of FIGS. 1 to 7. For this reason, identical reference numerals have been omitted from the drawing in the interest of simplicity. The conveying of the work holder and fixing it in place at the individual work station is thereby made independent of the shape or design of the brush body. This results from the condition that the transporting mechanism operates independent of this shape or design of the brush body. Thus, the work holders are conveyed through the medium of displacement cylinders or through the gripping of pins arranged in the work holders and functioning in conjunction with grasping arms. Accordingly, the conveying mechanism is entirely independent of the design and shape of the brush body. The conveying mechanism conveys always only the work holders. Thus, the conveying mechanism requires never any modification, since the cartridges or magazines are always of identical construction.

It will be understood that each of the elements described above, or two or more together, may also find a useful application in other types of constructions differing from the types described above.

While the invention has been illustrated and described as embodied in brush-processing arrangements, it is not intended to be limited to the details shown, since various modifications and structural changes may be made without departing in any way from the spirit of the present invention.

Without further analysis, the foregoing will so fully reveal the gist of the present invention that others can be applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is:

1. A work holder for holding brush bodies or similar workpieces during processing thereof comprising a base member having opposite sides; a pair of walls upwardly projecting from said opposite sides of said base member and defining between themselves a space adapted to receive a brush body, at least one of said walls being movable toward and away from the other wall; biasing means extending between said walls and cooperating with said movable wall for urging the same toward the other wall; and opening and closing means for moving said movable wall against the force of said biasing means away from the other wall so as to release a brush body placed between said walls and for releasing said movable wall for movement under the force of said biasing means to move toward said other wall so as to clamp a brush body placed between said walls.

2. A work holder as defined in claim 1, and including supporting means on said work holder for supporting a brush body thereon.

3. A work holder as defined in claim 2, wherein said supporting means have surfaces for supporting a brush body thereon which conform to the contours of said brush body.

4. A work holder as defined in claim 1, wherein said biasing means comprise spring means.

5. A work holder as defined in claim 4, wherein said spring means comprise a plurality of coil springs respectively connected to facing sides of said walls.

6. A work holder as defined in claim 1, wherein said movable wall is formed with a recessed portion and wherein said opening and closing means comprise a member movable substantially in the longitudinal direction of said walls between a pair of end positions, and movable member being formed with a second recessed portion, a bolt member inclined to said direction and reaching with opposite ends into said recessed portion, said bolt member being rotatable upon movement of said movable member in said direction so that rotation of said bolt member forces said movable wall against the force of said biasing means away from other wall, and means connected to said movable member for moving the same in said direction and form guiding the same during such movement.

7. A work holder as defined in claim 6, wherein said moving and guiding means comprise a pair of pins each connected at one end thereof to said movable member and projecting in said direction respectively from opposite ends of said movable member, and guide means on said base guiding said pins for movement in longitudinal direction.

8. A work holder as defined in claim 7, wherein the other end of one of said pins projects in one end position of said movable member beyond one end of said base while the other end of the other pin projects beyond the other end of said base in the other end position of said movable member.

9. A work holder as defined in claim 1, wherein both walls are mounted on said base member for movement toward and away from each other.

10. A work holder as defined in claim 9, wherein said opening and closing means comprises two rotatable bolt members in cooperative engagement with said two movable walls.

11. A work holder as defined in claim 9, and including two guide members cooperating with said movable walls to provide uniform motion of the latter.

12. A work holder as defined in claim 9, and including locating members on said movable walls for bearing against a brush body placed therebetween for holding the latter in a predetermined position within said work holder.

13. A work holder as defined in claim 1, and including guide means cooperating with said at least one movable wall for maintaining the latter during its movement toward and away from the other wall substantially parallel to the other wall.

14. A work holder as defined in claim 1, wherein said work holder is provided with cutouts for insertion of transporting means into said cutouts for transporting said work holder between work stations.

15. A work holder as defined in claim 14, wherein said cutouts are formed by cylindrical bores.